Patented Oct. 12, 1937

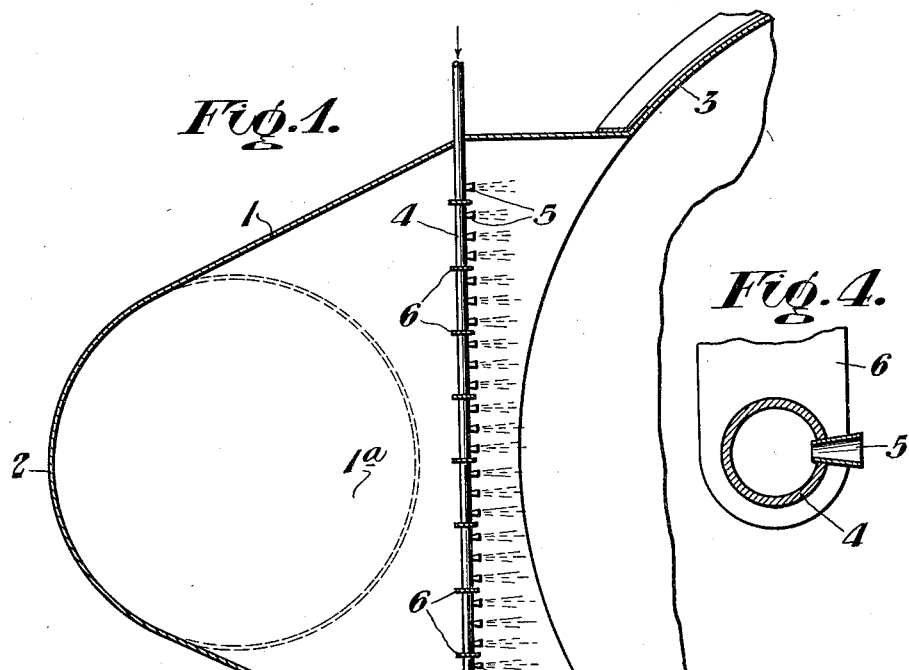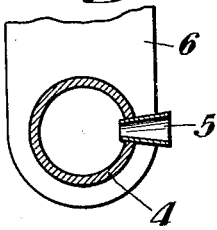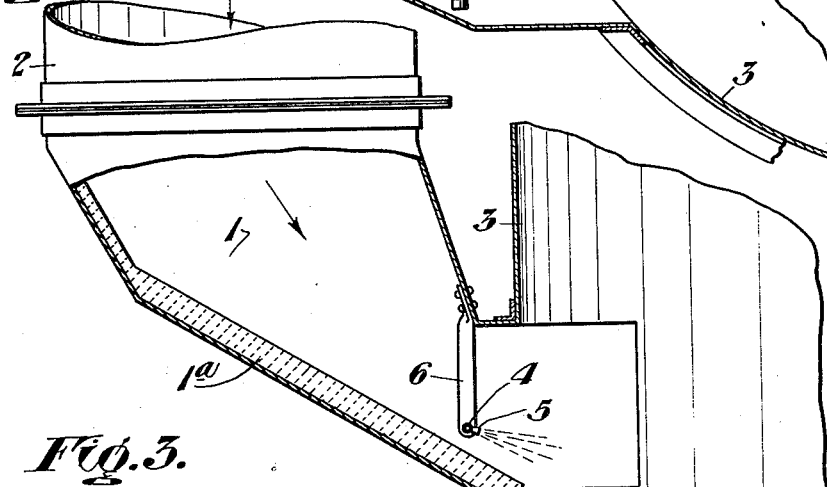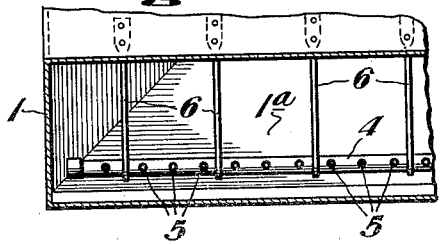

2,095,597

UNITED STATES PATENT OFFICE 2,095,597

CLEANER

William A. Drylie, Swissvale, Pa.

Application May 20, 1936, Serial No. 80,860

1 Claim. (Cl. 183—76)

This invention relates to cleaners and is particularly concerned with preventing dust and dirt from clogging the gas passages of blast-furnace gas handling and cleaning equipment.

A specific example of the invention is illustrated by the accompanying drawing, in which:

Figure 1 is a horizontal section.
Figure 2 is a vertical section.
Figure 3 is a fragmentary cross-section.
Figure 4 is an enlargement of Figure 2.

This drawing illustrates a closed rectangular chute connection 1 between a vertical flue 2 and the horizontal inlet of a chamber 3 in which the gas is treated for the removal of dust and dirt which it carries. The chute connection 1 has a flat declining bottom 1a leading to the inlet and against which dust and dirt from dusty and dirty gas is prone to collect so as to reduce the gas passage. When apparatus of this character is handling blast-furnace gas such dust and dirt accumulations are frequently encountered.

A horizontal pipe 4 is arranged transversely through the chute connection 1 and has a row of spaced spray nozzles 5 in its side. This pipe is revoluble so that when supplied with fluid, such as water under pressure, it may be turned to provide sprays that force the dust and dirt from wherever it collects in the chute connection 1. Normally, this dust and dirt collects at the lower end of the bottom 1a, and for this reason the drawing shows the pipe 4 turned so that its sprays are directed downwardly towards the horizontal inlet of the chamber 3.

Preferably, the pipe 4 is positioned at a level about ⅓ of the height of the inlet of the chamber 3. It may be suspended by a plurality of spaced hangers 6 which depend from the upper wall of the chute connection 1.

As shown by the drawing, the nozzles 5 should be flared to produce sprays rather than solid streams. Blast-furnace dust and dirt is of a very fine character, and the spray action is sufficient to effect proper cleaning without undue erosion.

Although a specific application of the cleaner has been disclosed, it is to be understood that it is adaptable at any place in a blast-furnace gas handling system where accumulations are prone to clog passages.

I claim:

A blast-furnace gas handling system including the combination of a closed rectangular chute connection between a vertical flue and the horizontal inlet of a chamber, said chute connection having a flat declining bottom leading to said inlet and adjacent which dust and dirt from dusty and dirty gas is prone to collect so as to reduce the gas passage, and a horizontal pipe arranged transversely through said chute and having a row of spray nozzles in its side all pointing in the same direction, said pipe being revoluble so that when supplied with fluid it may be turned to provide sprays that force said dust and dirt from wherever it may collect in said chute connection.

WILLIAM A. DRYLIE.